US008866754B2

(12) United States Patent
Homma et al.

(10) Patent No.: US 8,866,754 B2
(45) Date of Patent: Oct. 21, 2014

(54) INFORMATION PROCESSING APPARATUS, INFORMATION PROCESSING METHOD AND INFORMATION PROCESSING PROGRAM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 12/699,989

(22) Filed: Feb. 4, 2010

(65) Prior Publication Data
US 2010/0225601 A1 Sep. 9, 2010

(30) Foreign Application Priority Data

Mar. 9, 2009 (JP) ................. P2009-055406

(51) Int. Cl.
*G06F 3/041* (2006.01)
*G06F 3/0488* (2013.01)
*G06F 1/16* (2006.01)

(52) U.S. Cl.
CPC ............ *G06F 3/0416* (2013.01); *G06F 3/0488* (2013.01); *G06F 1/1641* (2013.01)
USPC .............. 345/173; 345/1.1; 345/1.2; 345/1.3; 345/2.2; 345/2.3; 345/3.3; 345/3.4; 715/863

(58) Field of Classification Search
USPC .............. 345/173–179, 1.1, 1.2, 1.3, 2.1, 2.2, 345/2.3, 3.1, 3.2, 3.3, 3.4; 715/863
See application file for complete search history.

(56) References Cited

U.S. PATENT DOCUMENTS

| | | | | |
|---|---|---|---|---|
| 6,545,669 B1* | 4/2003 | Kinawi et al. | ................. | 345/173 |
| 2005/0259378 A1* | 11/2005 | Hill et al. | ...................... | 361/271 |
| 2005/0270278 A1* | 12/2005 | Ouchi | ........................... | 345/173 |
| 2007/0279396 A1* | 12/2007 | Miyagawa et al. | ........... | 345/173 |

FOREIGN PATENT DOCUMENTS

JP 9-311757 12/1997

* cited by examiner

*Primary Examiner* — William Boddie
*Assistant Examiner* — Sahlu Okebato
(74) *Attorney, Agent, or Firm* — Sherr & Jiang, PLLC

(57) ABSTRACT

An information processing apparatus includes: touch operation sections provided to be spaced from each other by a specified distance and detect a position touched by an operating part; a drag detection section to detect a drag moved in a state where the operating part touches the touch operation sections; a vibration detection section to detect a vibration amount of the touch operation sections; a vibration acquisition section to acquire the vibration amount in a period after the drag detection section detects that an arbitrary touch operation section is dragged among the touch operation sections and before the drag detection section detects that another touch operation section adjacent to the arbitrary touch operation section is dragged; and a drag determination section to determine, based on the vibration amount, whether the drag on the arbitrary touch operation section is continuous with the drag on the another touch operation section.

14 Claims, 13 Drawing Sheets

STATE OF DRAG BETWEEN TOUCH PANELS

INFORMATION PROCESSING APPARATUS OF FIRST AND SECOND EMBODIMENTS

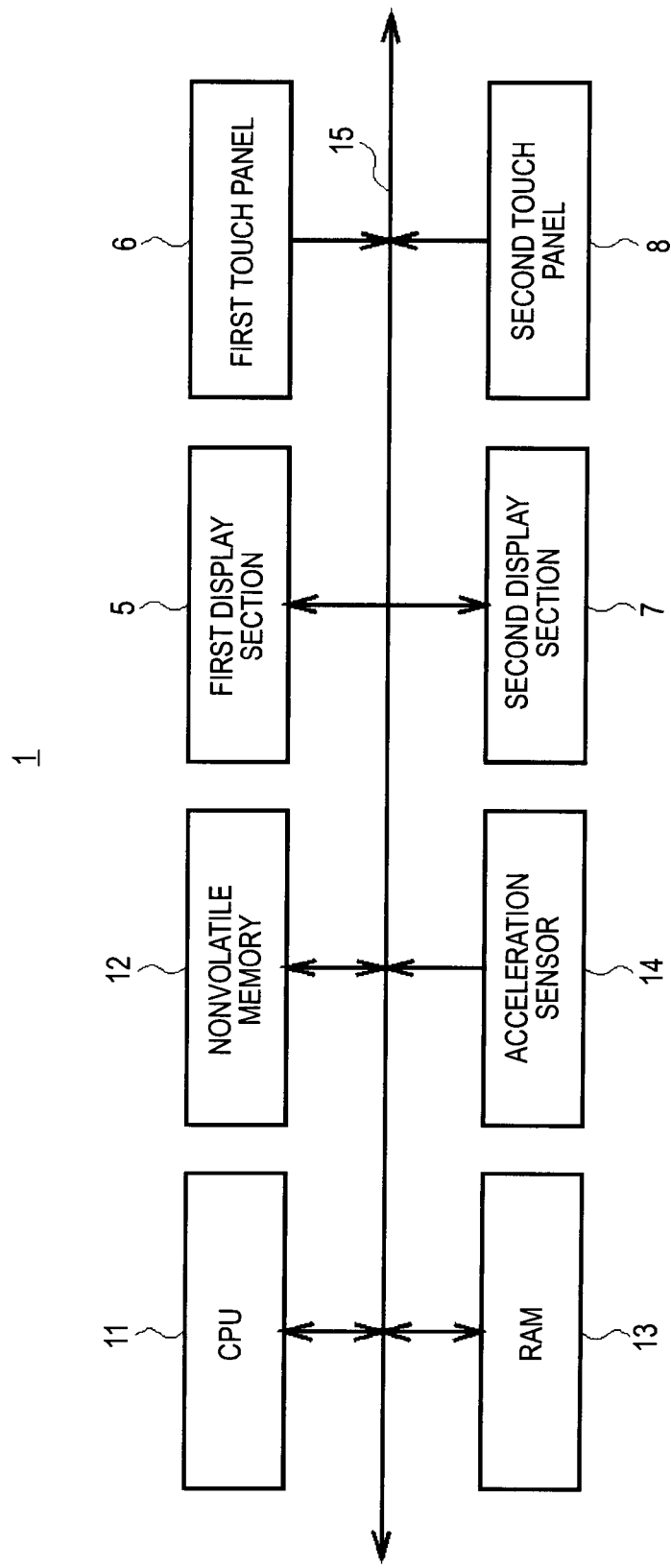

COORDINATE SYSTEM OF TOUCH PANEL

EXAMPLE OF SCREEN DISPLAY DIVIDED INTO UPPER AND LOWER PARTS

STATE OF DRAG BETWEEN TOUCH PANELS

VIBRATION TO TOUCH PANEL

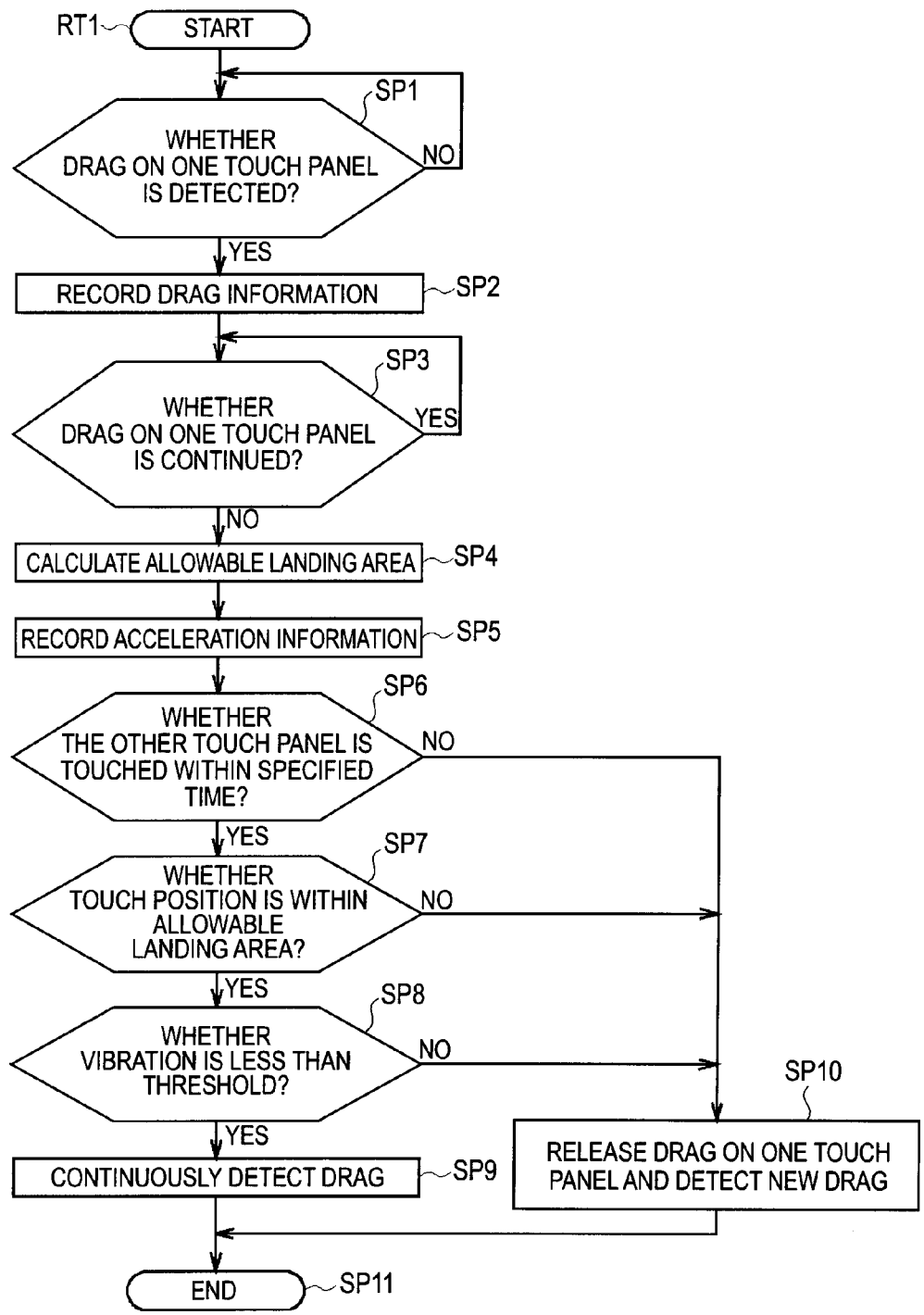

FUNCTIONAL STRUCTURE OF INFORMATION PROCESSING APPARATUS OF FIRST EMBODIMENT

STATE OF CALCULATION OF OPEN ANGLE

SECOND PROCEDURE OF DETECTION PROCESS OF
DRAG BETWEEN TOUCH PANELS (2)

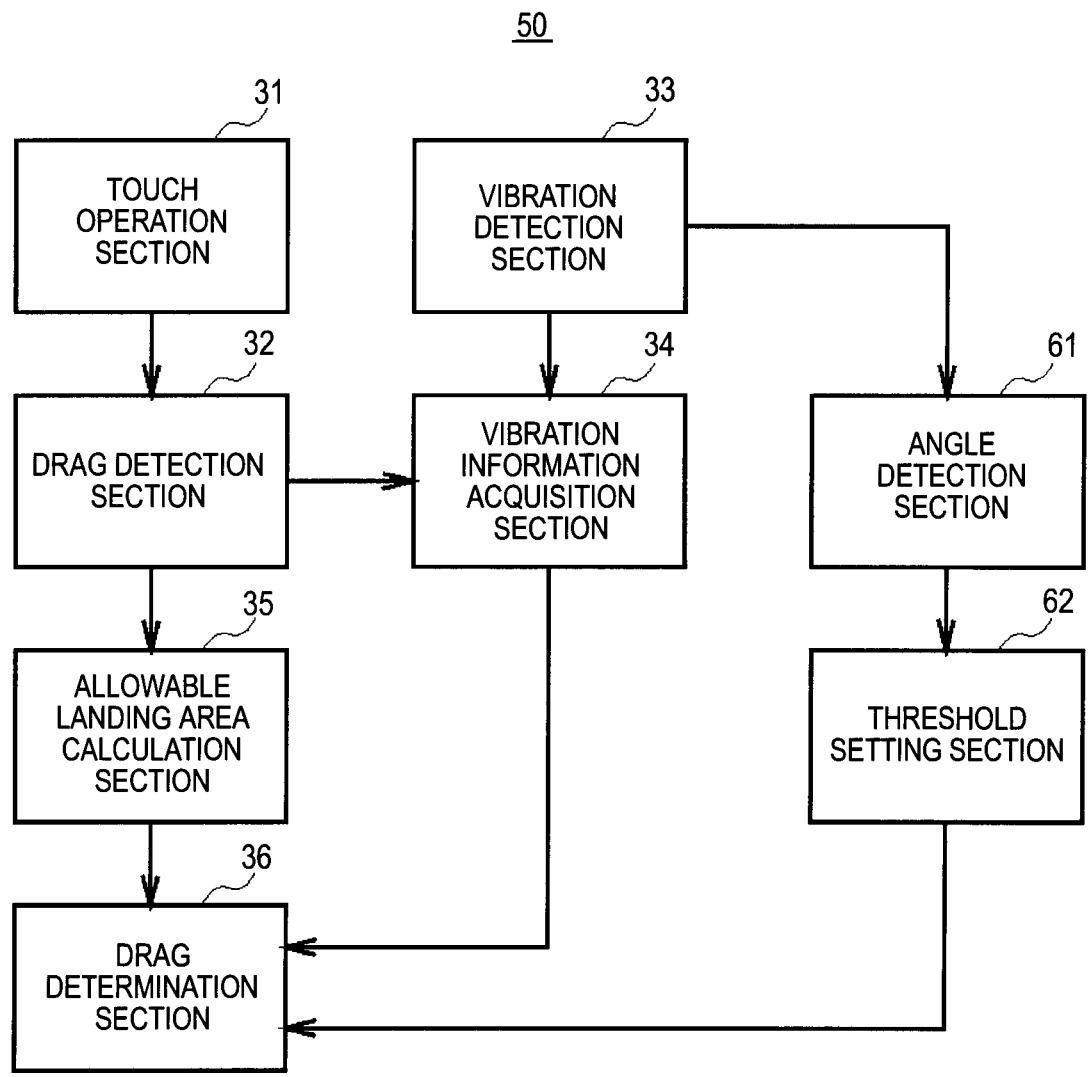

INFORMATION PROCESSING APPARATUS, INFORMATION PROCESSING METHOD AND INFORMATION PROCESSING PROGRAM

BACKGROUND OF THE INVENTION

1. Field of the Invention

The present invention relates to an information processing apparatus, an information processing method and an information processing program, and particularly to an information processing apparatus, an information processing method and an information processing program, in which touch panels are respectively provided on, for example, two screens provided to be separated from each other, and a drag is performed continuously between the touch panels.

2. Description of the Related Art

Hitherto, in a portable information processing apparatus, there is a contrivance which includes two display sections and touch panels respectively provided on the two display sections, and can be folded so that the two display sections face each other when it is carried.

In the information processing apparatus as stated above, since the two display sections are provided, more display information can be visually recognized by the user, and the apparatus can be easily carried since it can be folded at the time of carrying.

However, in the information processing apparatus, since the two touch panels are independently provided, there is a problem that a continuous drag from one touch panel to the other touch panel can not be recognized as a series of drags.

Then, in the information processing apparatuses, there is one in which after one touch panel is dragged, when the other touch panel is dragged within a specified time, the operation is regarded as a continuous drag, and a process corresponding to the continuous drag is performed (see, for example, JP-A-9-311757 (patent document 1)).

SUMMARY OF THE INVENTION

In the foregoing information processing apparatus, since a period of time in which an operation is shifted from the one touch panel to the other touch panel varies according to the user or the circumstances, and there is a problem that the continuous drag can not be detected at high precision.

Thus, it is desirable to provide an information processing apparatus, an information processing method and an information processing program, in which a continuous drag between touch operation sections, which are touch panels, can be detected at high precision.

According to an embodiment of the present invention, there is provided an information processing apparatus including plural touch operation sections which are provided to be spaced from each other by a specified distance and detect a position touched by an operating part, a drag detection section to detect a drag moved in a state where the operating part touches the plural touch operation sections, a vibration detection section to detect a vibration amount of the plural touch operation sections, a vibration acquisition section to acquire the vibration amount detected by the vibration detection section in a period after the drag detection section detects that an arbitrary touch operation section is dragged among the plural touch operation sections and before the drag detection section detects that another touch operation section adjacent to the arbitrary touch operation section is dragged, and a drag determination section to determine, based on the vibration amount acquired by the vibration acquisition section, whether the drag on the arbitrary touch operation section is continuous with the drag on the another touch operation section.

Besides, according to another embodiment of the present invention, there is provided an information processing method including the steps of: detecting a drag moved in a state where an operating part touches plural touch operation sections which are provided to be spaced from each other by a specified distance and detect a position touched by the operating part; acquiring a vibration amount of the plural touch operation sections detected by a vibration detection section in a period after it is detected at the step of detecting the drag that an arbitrary touch operation section is dragged among the plural touch operation sections and before it is detected that another touch operation section adjacent to the arbitrary touch operation section is dragged; and determining, based on the vibration amount acquired at the step of acquiring the vibration amount, whether the drag on the another touch operation section is continuous with the drag on the arbitrary touch operation section.

Further, according to still another embodiment of the present invention, there is provided an information processing program to cause a computer to execute the steps of: detecting a drag moved in a state where an operating part touches plural touch operation sections which are provided to be spaced from each other by a specified distance and detect a position touched by the operating part; acquiring a vibration amount of the plural touch operation sections detected by a vibration detection section in a period after it is detected at the step of detecting the drag that an arbitrary touch operation section is dragged among the plural touch operation sections and before it is detected that another touch operation section adjacent to the arbitrary touch operation section is dragged; and determining, based on the vibration amount acquired at the step of acquiring the vibration amount, whether the drag on the another touch operation section is continuous with the drag on the arbitrary touch operation section.

By this, since it is determined based on the vibration amount of the touch operation section that the drag from the arbitrary touch operation section to the another touch operation section is continued, it is possible to determine whether the drag is continued in view of the touch state of the operating part to the touch operation section.

As described above, according to the embodiments of the present invention, since it is determined based on the vibration amount of the touch operation section that the drag from the arbitrary touch operation section to the another touch operation section is continued, it is possible to determine whether the drag is continued in view of the touch state of the operating part to the touch operation section, and an information processing apparatus, an information processing method and an information processing program can be realized, in which a continuous operation between touch operation sections can be detected at high precision.

BRIEF DESCRIPTION OF THE DRAWINGS

FIG. 2 is a schematic line view showing a circuit structure of the information processing apparatus of the first embodiment.

FIG. 7 is a flowchart for explaining a detection process procedure of drag between touch panels according to the first embodiment.

FIG. 13 is a schematic line view showing a functional structure of the information processing apparatus of the second embodiment.

DESCRIPTION OF THE PREFERRED EMBODIMENTS

Hereinafter, the best mode for carrying out the present invention (hereinafter referred to as an embodiment) will be described. The description is made in the following order.
1. First embodiment
2. Second embodiment
3. Other embodiments 1. First Embodiment

[1-1. Outer Appearance Structure of Information Processing Apparatus]

Figure 1A:
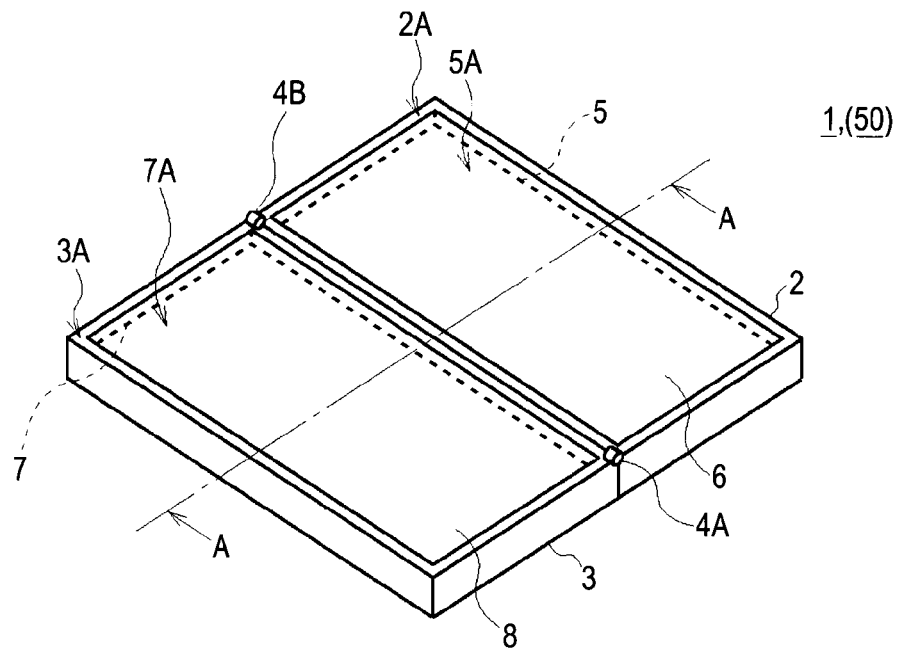
FIGS. 1A to 1C are schematic line views showing an outer appearance structure of an information processing apparatus of a first and a second embodiment.
Figure 1B:
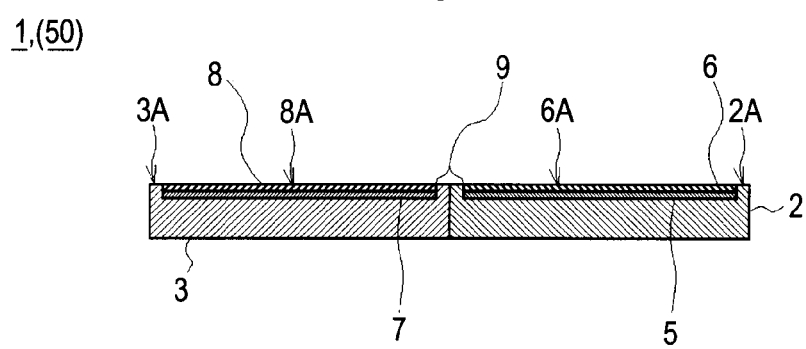
Figure 1C:
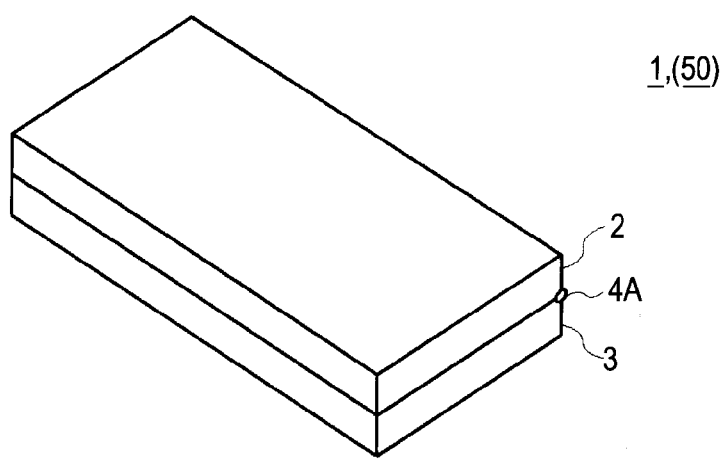

FIGS. 1A, 1B and 1C show the outer appearance structure of an information processing apparatus 1 of the first embodiment. FIG. 1B is an A-A sectional view of FIG. 1A.

In this information processing apparatus 1, a first housing section 2 and a second housing section 3 are coupled by coupling sections 4A and 4B made of, for example, hinges so as be rotatable in a direction in which they are separated from each other or approach each other, and are electrically connected to each other.

Each of the first housing section 2 and the second housing section 3 has a flat shape while its front surface 2A or 3A is formed into a substantially rectangular shape.

The first housing section 2 is provided with a first display section 5 made of, for example, an LCD (Liquid Crystal Display) or an organic EL (Electroluminescence) on the front surface 2A. Besides, a first touch panel 6 which has almost the same size as a display surface 5A, is transparent and is of, for example, a capacitance type is provided on the first display section 5 so as to cover the whole display surface 5A.

The second housing section 3 is provided with a second display section 7 made of, for example, an LCD or an organic EL on the front surface 3A. Besides, a second touch panel 8 which has almost the same size as a display surface 7A, is transparent and is of, for example, a capacitance type is provided on the second display section 7 so as to cover the whole display surface 7A.

When the front surface 2A of the first housing section 2 and the front surface 3A of the second housing section 3 are made parallel to each other and are directed in the same direction, the information processing apparatus is in an open state (hereinafter referred to also as a fully open state) in which the open angle between the front surface 2A and the front surface 3A is 180 degrees (FIG. 1A).

In the fully open state, the information processing apparatus 1 is used by the user while, for example, the first display section 5 of the first housing section 2 is made an upper screen, and the second display section 7 of the second housing section 3 is made a lower screen.

In the first housing section 2, the first touch panel 6 is provided on the display section 5 so that the front surface 2A and a surface (hereinafter referred to also as a touch surface) of the first touch panel 6 touched by the user are disposed on the same plane (FIG. 1B).

Besides, in the second housing section 3, the second touch panel 8 is provided on the display section 7 so that the front surface 3A and a touch surface 8A of the second touch panel 8 are disposed on the same plane.

Further, in the information processing apparatus 1, the first housing section 2 and the second housing section 3 are connected through the coupling sections 4A and 4B, so that the front surface 2A of the first housing section 2 and the front surface 3A of the second housing section 3 are disposed on the same plane in the fully open state.

Accordingly, in the information processing apparatus 1, the front surface 2A of the first housing section 2, the front surface 3A of the second housing section 3, the touch surface 6A of the first touch panel 6, and the touch surface 8A of the second touch panel 8 are disposed on the same plane in the fully open state.

In the information processing apparatus 1, the coupling sections 4A and 4B are respectively shorter than widths of both right and left edges of the first housing section 2 and the second housing section 3 where the first touch panel 6 and the second touch panel 8 are not provided.

Thus, in the information processing apparatus 1, an area (hereinafter referred to also as a gap area) 9 between the first touch panel 6 and the second touch panel 8 becomes flat in a longer direction of the first touch panel 6 and the second touch panel 8 in the fully open state (FIG. 1B).

On the other hand, when the front surface 2A of the first housing section 2 and the front surface 3A of the second housing section 3 contact with each other, the information processing apparatus 1 is in a state (hereinafter referred to also as a close state) where the open angle between the front surface 2A and the front surface 3A is 0 degree (FIG. 1C).

[1-2. Circuit Structure of the Information Processing Apparatus]

Next, a circuit structure of the information processing apparatus 1 will be described. As shown in FIG. 2, in the information processing apparatus 1, a CPU (Central Processing Unit) 11 reads a basic program stored in a nonvolatile memory 12 into a RAM 13 and executes it, and collectively controls the whole through a bus 15.

Besides, the CPU 11 reads various application programs stored in the nonvolatile memory 12 into the RAM 13 and executes them, and realizes various functions.

When a signal corresponding to a touched position (hereinafter referred to also as a touch position) is given from the first touch panel 6 and the second touch panel 8, the CPU 11 detects the touch position of the first touch panel 6 and the second touch panel 8 as a coordinate based on the signal.

Figure 3A:
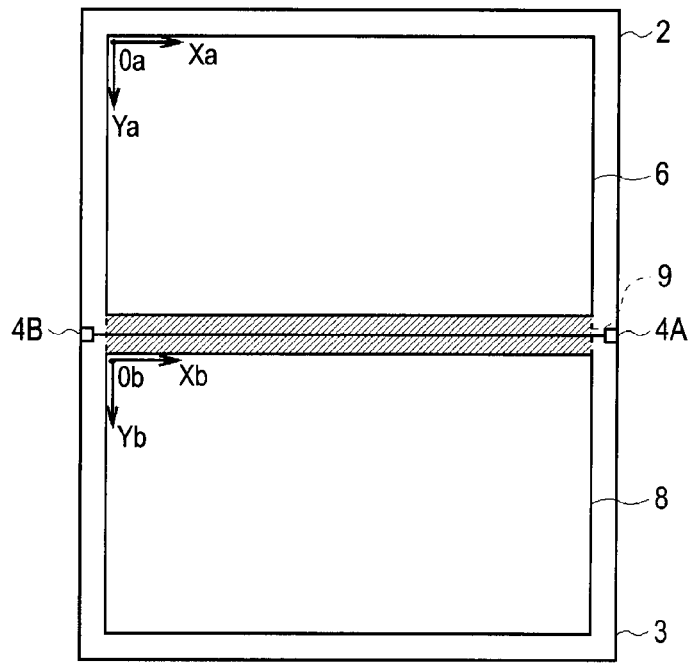
FIGS. 3A and 3B are schematic line views showing coordinate systems of touch panels.

Here, in the first touch panel 6, as shown in FIG. 3A, a first coordinate system is set in which an upper left corner is made an origin Oa, a longer direction of the first touch panel 6 is an Xa axis, and a shorter direction is a Ya axis. Besides, in the second touch panel 8, a second coordinate system is set in which an upper left corner is made an origin Ob, a longer direction of the second touch panel 8 is an Xb axis, and a shorter direction is a Yb axis.

The first touch panel 6 and the second touch panel 8 have the detection accuracy coincident with the screen resolution of the first display section 5 and the second display section 7, and detect the coordinate based on the detection accuracy.

That is, when the screen resolution of the first display section 5 is, for example, VGA (Video Graphics Array) having 640×480 pixels, the CPU 11 detects the coordinate of the touch position on the first touch panel 6 in the range of 1 to 640 in the Xa axis direction and 1 to 480 in the Ya axis direction.

Similarly, when the screen resolution of the second display section 7 is, for example, VGA having 640×480 pixels, the CPU 11 detects the coordinate of the touch position on the second touch panel 8 in the range of 1 to 640 in the Xb axis direction and 1 to 480 in the Yb axis direction.

Figure 3B:
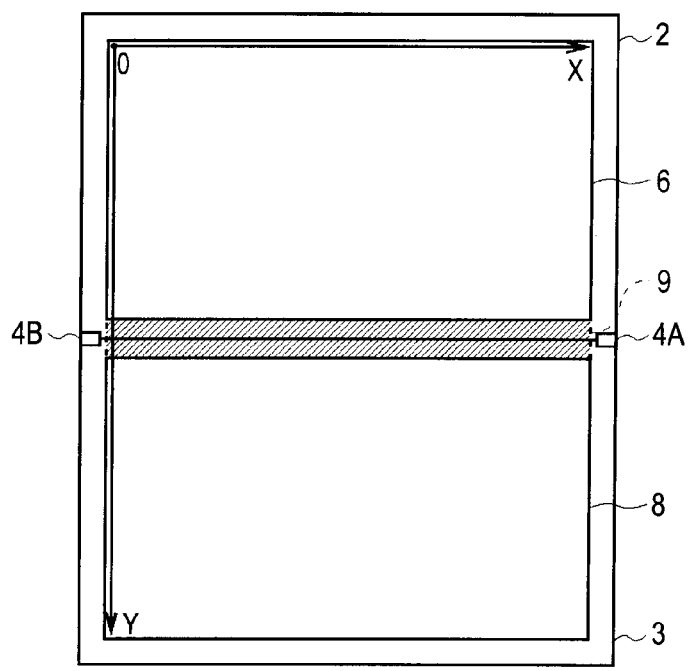

As shown in FIG. 3B, the CPU 11 converts the first coordinate system and the second coordinate system into one absolute coordinate system, and can detect the touch position on the first touch panel 6 and the second touch panel 8 in the one coordinate system.

In the absolute coordinate system, the upper left corner of the first touch panel 6 is made the origin O, the longer direction of the first touch panel 6 is set to the X axis, and the shorter direction is set to the Y axis.

In the information processing apparatus 1, the gap area 9 is provided between the first touch panel 6 and the second touch panel 8. In the information processing apparatus 1, a coordinate distance in the Y axis direction in the absolute coordinate system corresponding to the physical distance of the gap area 9 in the Y axis direction is previously stored as gap information in the nonvolatile memory 12.

For example, when the physical distance of the gap area 9 in the Y axis direction is 1 cm, and the pixel pitch of the first display section 5 and the second display section 7 is 0.1 mm, "100" as the coordinate distance corresponding to the physical distance of the gap area 9 in the Y axis direction is the gap information.

Accordingly, when the touch position on the second touch panel 8 is detected, the CPU 11 reads the gap information previously stored in the nonvolatile memory 12. The CPU 11 calculates the coordinate (1, 581) of the upper left corner of the second touch panel 8 based on "100" as the coordinate distance corresponding to the physical distance of the gap area 9 in the Y axis direction, which is based on the gap information, and "480" as the coordinate range of the first touch panel 6 in the Y axis direction.

The CPU 11 detects the coordinate of the touch position on the second touch panel 8 with reference to the coordinate (1, 581) of the upper left corner of the second touch panel 8.

As stated above, the CPU 11 can detect the coordinate of the touch position on the first touch panel 6 and the second touch panel 8.

The CPU 11 determines whether an instruction is correlated with the detected coordinate corresponding to the touch position, and when determining that the instruction is correlated, the CPU performs various operations based on the instruction.

Figure 4A:
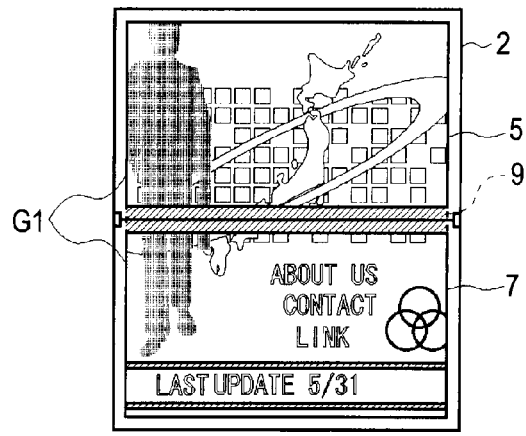
FIGS. 4A to 4C are schematic line views showing examples of a screen display divided into an upper part and a lower part.

Specifically, as shown in FIG. 4A, when executing the program of Web browser in response to the user operation to the first touch panel 6 or the second touch panel 8, the CPU 11 acquires Web page data through a wireless communication unit (not shown).

The CPU 11 divides a Web browser screen G1 based on the acquired Web page data and displays it on the first display section 5 and the second display section 7.

At this time, for example, when an operation (hereinafter referred to also as a drag) in which a user's finger slides on the first touch panel 6 or the second touch panel 8 while the finger is kept touched is performed in, for example, an up and down direction, as an instruction corresponding to the drag, the CPU 11 moves and displays the Web browser screen G1 in the up and down direction.

Figure 4B:
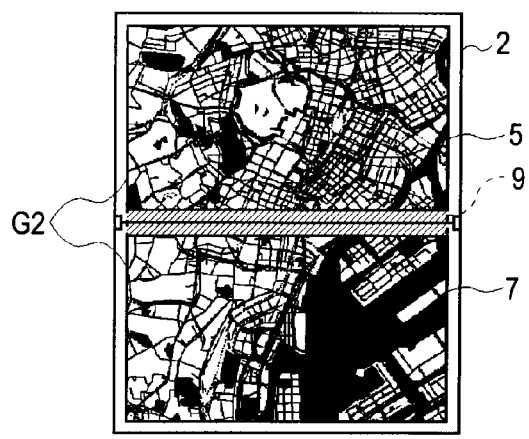

Besides, as shown in FIG. 4B, when executing a map display program in response to the user operation to the first touch panel 6 or the second touch panel 8, the CPU 11 reads map image data from the nonvolatile memory 12.

Then, the CPU 11 divides a map screen G2 based on the read map image data and displays it on the first display section 5 and the second display section 7.

At this time, when the drag is performed on the first touch panel 6 or the second touch panel 8 in the up and down direction, for example, the CPU 11 zooms in or zooms out the map screen G2 according to the drag in the up and down direction, and displays it.

Besides, when a drag to draw a circle is performed on the first touch panel 6 or the second touch panel 8, for example, the CPU 11 rotates and displays the map screen G2 in response to the drag.

Figure 4C:
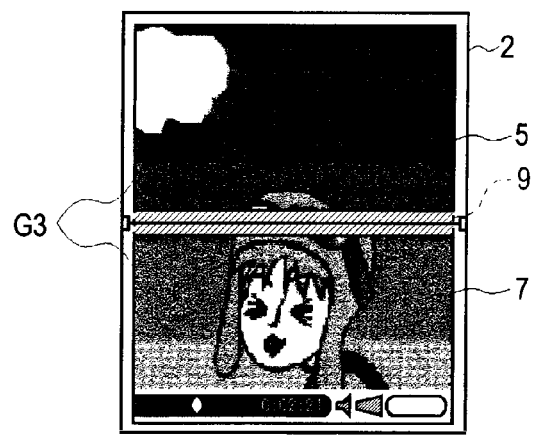

Further, as shown in FIG. 4C, when executing a video replay program in response to the user operation to the first touch panel 6 or the second touch panel 8, the CPU 11 reads video data from the nonvolatile memory 12.

The CPU 11 divides a moving image G3 based on the read video data and displays it on the first display section 5 and the second display section 7.

At this time, when a drag in the up and down direction is performed on the first touch panel 6 or the second touch panel 8, the CPU 11 increases or decreases, for example, the volume according to the drag in the up and down direction.

Besides, when a drag in the right and left direction is performed on the first touch panel 6 or the second touch panel 8, the CPU 11 performs, for example, fast-forward or rewind of the moving image G3 according to the drag in the right and left direction.

As stated above, when various programs are executed, the CPU 11 executes the processes corresponding to the drags assigned to the various programs.

In addition to the above structure, in the information processing apparatus 1 (FIG. 2), for example, an acceleration sensor 14 is provided in the second housing section 3. The acceleration sensor 14 can measure acceleration in the longer direction of the first touch panel 6 and the second touch panel 8, acceleration in the shorter direction thereof, and acceleration in the direction vertical to the touch surface 6A of the first touch panel 6 and the touch surface 8A of the second touch panel 8. In the first embodiment, the gravitational acceleration is not considered.

[1-3. Detection Process of Drag Between Touch Panels]

The CPU 11 reads a program of a detection process of drag between touch panels, which is an information processing program of the embodiment according to the invention, from the nonvolatile memory 12 and executes it, and executes the detection process of drag between touch panels.

Figure 5:
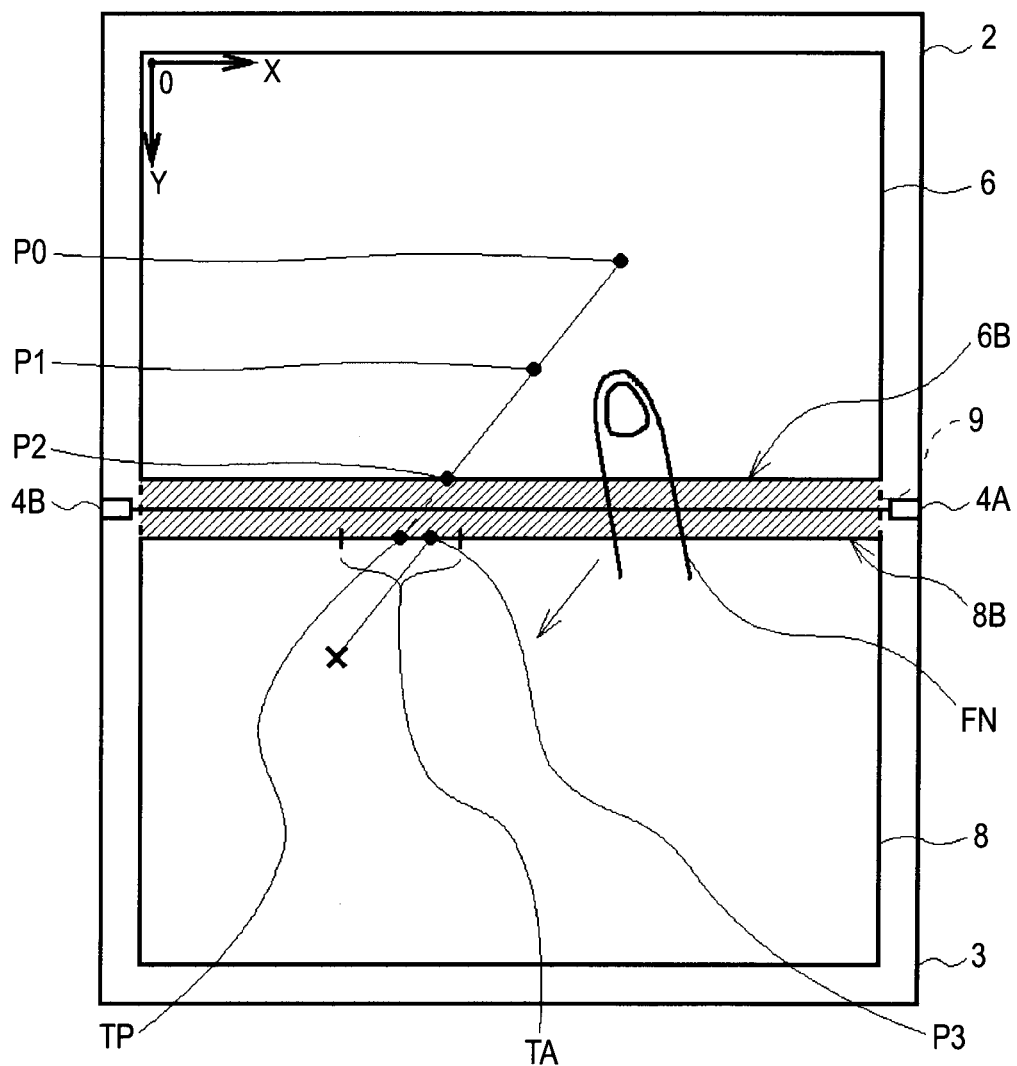
FIG. 5 is a schematic line view showing a state of a drag between touch panels.

Specifically, as shown in FIG. 5, when a touch position P0 of the first touch panel 6 is touched by the finger FN, the CPU 11 detects the coordinate (400, 280) of the touch position P0 and a time t0 at that time. The CPU 11 correlates the coordinate (400, 280) of the touch position P0 with the time t0, and stores them as drag information in the nonvolatile memory 12.

When the finger FN of the user keeps touching, the CPU 11 continues to detect the coordinate of the touch position at specified time intervals. At this time, when the touching continues and the touch position is changed, the CPU 11 detects the series of touch operations as the drag.

When a touch position P1 of the first touch panel 6 is touched by the finger FN at, for example, time t1 when a specified interval time passes from time t0, the CPU 11 detects the coordinate (300, 380) of the touch position P1. The CPU 11 correlates the coordinate (300, 380) of the touch position P1 with the time t1 and stores them as drag information.

Further, when the finger FN is moved to the outside of the first touch panel 6, the CPU 11 detects a coordinate (200, 480) of a touch position P2 just before the drag of the finger FN on the first touch panel 6 comes not to be detected. At this time, the CPU 11 correlates the coordinate (200, 480) of the touch position P2 with time t2 at that time and stores them as drag information.

Here, when the Y coordinate of the touch position P2 is "480", that is, when the finger FN is moved to the outside from the lower side 6B of the first touch panel 6, it is conceivable that the finger FN performs a continuous drag (hereinafter referred to also as a drag between touch panels) from the first touch panel 6 to the second touch panel 8.

Then, based on the drag information stored in the nonvolatile memory 12, the CPU 11 calculates, as a tolerable landing area TA, a coordinate range of the second touch panel 8 which would be touched by the finger FN.

Specifically, when reading the drag information from the nonvolatile memory 12, the CPU 11 extracts the coordinate (200, 480) of the touch position P2 just before the drag on the first touch panel 6 comes not to be detected and the time t2 at that time from the drag information.

Besides, the CPU 11 searches the drag information for the coordinate of the touch position, for example, one second before the time t2 when the touch position P2 is touched. At this time, when the time one second before the time t2 is the time t1, the CPU 11 extracts the coordinate (300, 380) of the touch position P1 correlated with the time t1 from the drag information.

The CPU 11 calculates a straight line connecting the touch positions P1 and P2 from the coordinate (300, 380) of the touch position P1 and the coordinate (200, 480) of the touch position P2. The CPU 11 calculates a coordinate (100, 581) of an estimated landing position P which is an intersection point between the calculated straight line and the coordinate range of the Y coordinate of "581" which corresponds to the upper side 8B of the second touch panel 8.

When the user performs the drag between touch panels, it is conceivable that the drag is performed almost linearly. However, a slight shift may occur.

Then, the CPU 11 calculates a difference value (100 in this case) in the X axis direction between the coordinate (200, 480) of the touch position P2 and the coordinate (100, 581) of the estimated landing position TP.

The CPU 11 sets a range corresponding to, for example, 20% of the calculated difference value in the positive and negative directions of the X axis with reference to the estimated landing position TP, and calculates the tolerable landing area TA of coordinate (80, 581) to (120, 581).

On the other hand, the acceleration sensor 14 detects the acceleration at specified intervals from the time point when the drag on the first touch panel 6 comes not to be detected by the CPU 11, and records the detected acceleration as acceleration information in the nonvolatile memory 12.

The CPU 11 determines whether a specified time passes from the time point when the drag on the first touch panel 6 comes not to be detected.

The specified time is set to be sufficiently longer than a time in which the user performs the drag between touch panels from the first touch panel 6 to the second touch panel 8, for example, five seconds. Accordingly, when the drag on the first touch panel 6 comes not to be detected, and the specified time passes from the time point when it is detected that the touch position P2 is touched, the CPU 11 determines that the drag between touch panels is not performed from the first touch panel 6 to the second touch panel 8.

When the drag on the first touch panel 6 comes not to be detected, and the second touch panel 8 is touched in the specified time from the time t2 when it is detected that the touch position P2 is touched, the CPU 11 detects the touch position P3 and acquires time t3 at that time.

At this time, the CPU 11 controls the acceleration sensor 14 to end the detection of acceleration. Accordingly, the acceleration sensor 14 measures the acceleration at the specified time intervals from the time t2 to the time t3, and records the measured acceleration as acceleration information in the nonvolatile memory 12.

Figure 6A:
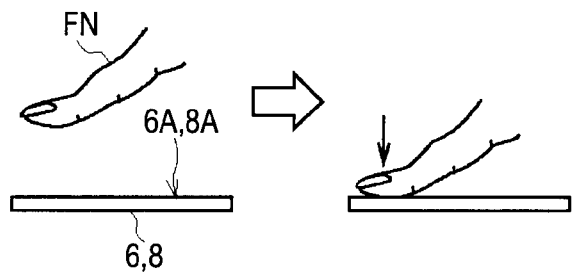
FIGS. 6A to 6F are schematic line views showing vibrations of touch panels.
Figure 6D:
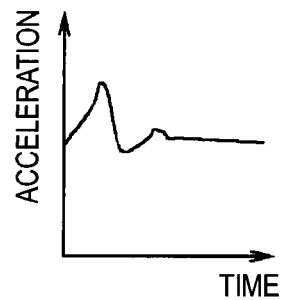

As shown in FIGS. 6A and 6D, the acceleration sensor 14 detects, as the acceleration, a vibration in the vertical direction to the touch surface 6A or the touch surface 8A when the first touch panel 6 or the second touch panel 8 is depressed by the finger FN.

Here, the vertical direction to the touch surface 6A and the touch surface 8A is defined as a Z axis, and a direction from the touch surface 6A and the touch surface 8A to the back surface of the first housing section 2 and the back surface (not shown) of the second housing section 3 is defined as a positive direction.

Accordingly, when the first touch panel 6 or the second touch panel 8 is depressed by the finger FN, the acceleration sensor 14 detects, as the acceleration, the vibration in the positive Z axis direction generated by the depressing operation.

Figure 6B:
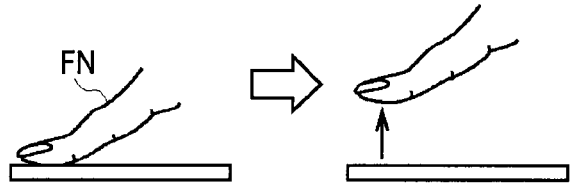
Figure 6E:
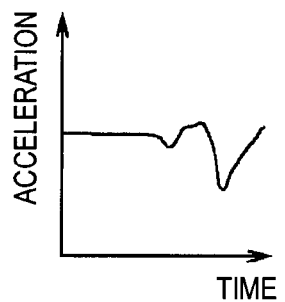

As shown in FIGS. 6B and 6E, when an operation (hereinafter referred to also as a separating operation) in which the finger FN is separated from the first touch panel 6 or the second touch panel 8 is performed, the acceleration sensor 14 detects, as the acceleration, the vibration in the negative Z axis direction generated by the separating operation.

Figure 6C:
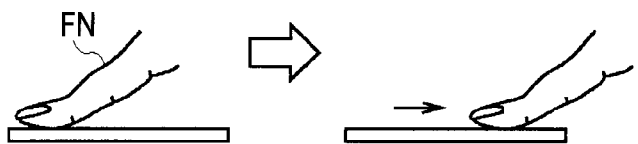
Figure 6F:
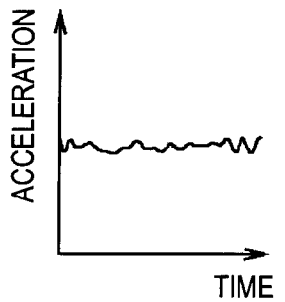

On the other hand, as shown in FIGS. 6C and 6F, when the first touch panel 6 or the second touch panel 8 is dragged by the finger FN, the acceleration sensor 14 detects only the minute vibration in the Z axis as the acceleration. This is because the force generated when the depressing operation or the separating operation is performed is not applied.

Accordingly, the CPU 11 determines whether the touch position P3 is within the tolerable landing area TA, and when the touch position P3 is within the tolerable landing area TA, the CPU 11 determines whether the absolute value of the acceleration in the Z axis direction based on the acceleration information read from the nonvolatile memory 12 is within a threshold.

The threshold is set to a value smaller than the absolute value of the acceleration in the Z axis direction caused by the vibration generated when the depressing operation or the separating operation is performed to the first touch panel 6 or the second touch panel 8 by the finger FN. Besides, the threshold is set to the value larger than the absolute value of the acceleration caused by the vibration generated by the drag on the first touch panel 6 or the second touch panel 8.

When the absolute value of the acceleration in the Z axis direction based on the acceleration information read from the nonvolatile memory 12 is within the threshold, the CPU 11 determines that the depressing operation and the separating operation is not performed by the finger FN.

At this time, the CPU 11 determines that the drag between touch panels is performed by the user from the first touch panel 6 to the second touch panel 8, and detects, as the continuous drag, the drag on the first touch panel 6 and the drag on the second touch panel 8.

When determining that the drag between touch panels is not performed by the user, the CPU 11 cancels the drag on the first touch panel 6, and detects the drag on the second touch panel 8 as a new drag.

[1-4. Procedure of Detection Process of Drag Between Touch Panels]

Next, the procedure of detection process of drag between touch panels will be described with reference to a flowchart of FIG. 7. Actually, the CPU 11 starts with a start step of routine RT1, shifts to step SP1, and detects whether the first touch panel 6 or the second touch panel 8 is dragged.

Here, when a negative result is obtained, this means that the first touch panel 6 and the second touch panel 8 are not dragged, and the CPU returns to step SP1 and waits until the first touch panel 6 or the second touch panel 8 is dragged.

On the other hand, when a positive result is obtained at step SP1, this means that the first touch panel 6 or the second touch panel 8 is dragged, and a shift is made to next step SP2. At step SP2, the CPU 11 detects a coordinate of a touch position at specified time intervals, correlates the coordinate of the touch position with the touch time, records them as drag information in the nonvolatile memory 12, and shifts to next step SP3.

At step SP3, for example, when the first touch panel 6 is dragged at step SP2, the CPU 11 determines whether the drag on the first touch panel 6 is continued.

Here, when a positive result is obtained, this means that the first touch panel 6 is dragged by the finger FN. At this time, the CPU 11 returns to step SP3, and repeats until the drag on the first touch panel 6 comes not to be detected.

On the other hand, when a negative result is obtained at step SP3, this means that the drag on the first touch panel 6 comes not to be detected, and a shift is made to next step SP4.

At step SP4, the CPU 11 calculates the estimated landing position TP based on the drag information, calculates the tolerable landing area TA of the specified range in the positive and negative directions of the X axis with reference to the estimated landing position TP, and shifts to next step SP5.

At step SP5, the CPU 11 controls the acceleration sensor 14 to measure the acceleration at specified time intervals, stores the measured acceleration as acceleration information in the nonvolatile memory 12, and shifts to next step SP6.

At step SP6, the CPU 11 determines whether the second touch panel 8 is touched within the specified time from the time point when the drag on the first touch panel 6 comes not to be detected.

Here, when a negative result is obtained, this means that the drag between touch panels is not performed from the first touch panel 6 to the second touch panel 8, and at this time, the CPU 11 shifts to step SP10.

On the other hand, when a positive result is obtained at step SP6, this means that the second touch panel 8 is touched within the specified time from the time point when the drag on the first touch panel 6 comes not to be detected, and a shift is made to next step SP7.

At step SP7, the CPU 11 determines whether the touch position on the second touch panel 8 is within the tolerable landing area TA. Here, when a negative result is obtained, this means that the touch position on the second touch panel 8 is outside the tolerable landing area TA, and the CPU 11 shifts to step SP10.

On the other hand, when a positive result is obtained at step SP7, this means that the touch position on the second touch panel 8 is within the tolerable landing area TA, and the CPU 11 shifts to next step SP8.

At step SP8, the CPU 11 determines whether the absolute value of the acceleration in the Z axis direction based on the acceleration information recorded at step SP5 is within the threshold. Here, when a negative result is obtained, this means that the depressing operation or the separating operation is performed to the second touch panel 8 by the finger FN, and the CPU 11 shifts to step SP10.

On the other hand, when a positive result is obtained at step SP8, this means that the drag between touch panels is performed by the user from the first touch panel 6 to the second touch panel 8, and the CPU 11 shifts to next step SP9.

At step SP9, the CPU 11 detects, as the continuous drag, the drag on the first touch panel 6 and the drag on the second touch panel 8, shifts to next step SP1 and ends the process.

On the other hand, at step SP10, the CPU 11 cancels the drag on the first touch panel 6, detects the drag on the second touch panel 8 as a new drag, shifts to next step SP11 and ends the process.

When the detection process of the drag between touch panels is ended, the CPU 11 again executes the detection process of the drag between touch panels. For example, the CPU always executes the detection process of the drag between touch panels when the information processing apparatus 1 is in the on state.

[1-5. Operation and Effect]

In the above structure, when the information processing apparatus 1 is in the fully open state, the touch surface 6A of the first touch panel 6, the touch surface 8A of the second touch panel 8, and the gap area 9 are disposed on the same plane.

For example, after detecting that the first touch panel 6 is dragged in the fully open state, the information processing apparatus 1 comes not to detect the drag on the first touch panel 6, and detects that a position within the coordinate range corresponding to the lower side 6B is touched by a drag.

At this time, the information processing apparatus 1 detects the vibration to the first touch panel 6 and the second touch panel 8 as the acceleration by the acceleration sensor 14. Besides, the information processing apparatus 1 calculates the coordinate range of the second touch panel 8, which would be touched when the user performs the drag between touch panels, as the tolerable landing area TA.

The information processing apparatus 1 determines whether the second touch panel 8 is touched within the specified time from the time point when the drag on the first touch panel 6 comes not to be detected.

By this, the information processing apparatus 1 can reduce the processing load that the acceleration is continued to be measured by the acceleration sensor 14 although the drag between touch panels is not performed.

Besides, when the second touch panel 8 is touched within the specified time, the information processing apparatus 1 determines whether the touch position on the second touch panel 8 is within the tolerable landing area TA.

By this, when the user does not perform the drag between touch panels but touches an arbitrary position on the second touch panel 8, the information processing apparatus 1 does not determine that the drag between touch panels is performed. Accordingly, the information processing apparatus can detect the drag between touch panels at high precision.

Further, when the touch position of the second touch panel 8 is within the tolerable landing area TA, the information processing apparatus 1 determines whether the absolute value of the acceleration in the Z axis direction measured by the acceleration sensor 14 in the period from the time point when the drag on the first touch panel 6 comes not to be detected to the time point when the second touch panel 8 is touched is within the threshold.

When the acceleration measured by the acceleration sensor 14 is within the threshold, the information processing apparatus 1 determines that the drag between touch panels, which is the continuous drag, is performed from the first touch panel 6 to the second touch panel 8. The information processing apparatus 1 detects, as the continuous drag, the drag on the first touch panel 6 and the drag on the second touch panel 8.

By this, when the depressing operation or the separating operation is performed to the first touch panel 6 or the second touch panel 8, the information processing apparatus 1 does not determine that the drag between touch panels is performed. Accordingly, the information processing apparatus can detect the drag between touch panels at higher precision.

As stated above, after the first touch panel 6 is dragged, when the second touch panel 8 is touched within the specified time, the touch position is within the tolerable landing area TA, and the acceleration measured therebetween is within the threshold, the information processing apparatus 1 determines that the drag between touch panels is performed.

By this, the information processing apparatus 1 determines that the drag between touch panels is performed only when all the conditions are satisfied. Accordingly, the information processing apparatus can detect the drag between touch panels at higher precision.

According to the above structure, based on the acceleration detected by the acceleration sensor 14 after the first touch panel 6 is dragged and before it is detected that the second touch panel 8 is dragged, the information processing apparatus 1 determines whether the dragon the first touch panel and the second touch panel 8 is continued. By this, since the information processing apparatus 1 determines whether the drag is continued in view of the contact state of the finger FN on the first touch panel 6 and the second touch panel 8, the information processing apparatus can detect the continuous drag on the first touch panel 6 and the second touch panel 8 at higher precision.

[1-6. Functional Structure of the Information Processing Apparatus]

Figure 8:
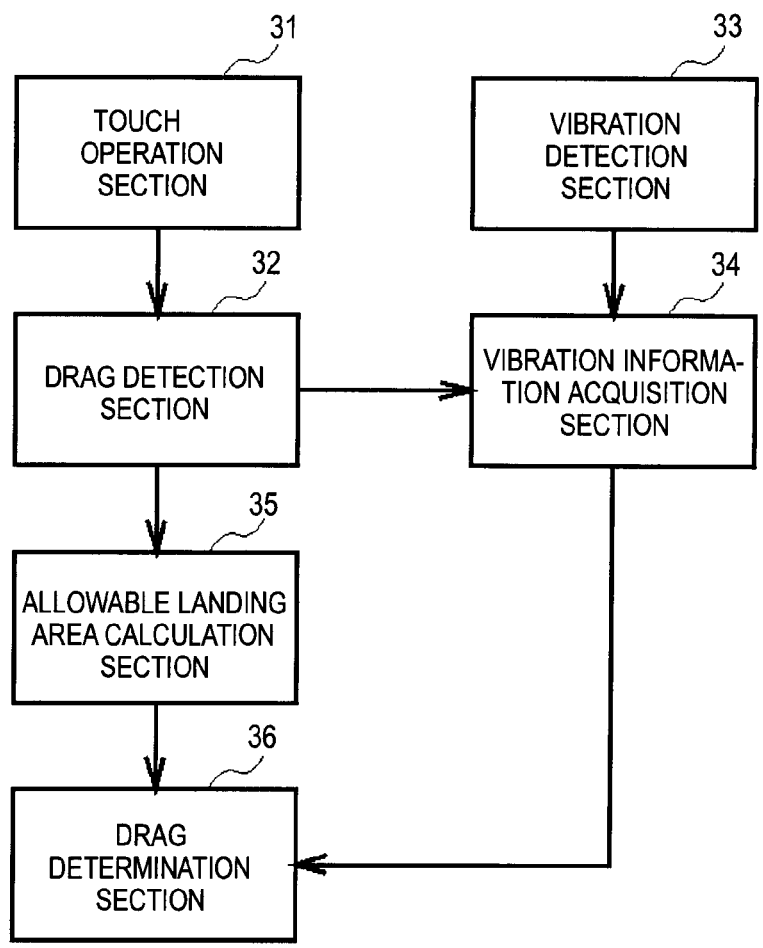
FIG. 8 is a schematic line view showing a functional structure of the information processing apparatus of the first embodiment.

Here, the functional structure of the information processing apparatus 1 of the first embodiment will be described. As shown in FIG. 8, the information processing apparatus 1 functions as a touch operation section 31, a drag detection section 32, a vibration detection section 33, a vibration information acquisition section 34, an tolerable landing area calculation section 35 and a drag determination section 36.

In the information processing apparatus 1, the first touch panel 6 and the second touch panel 8 function as the plural touch operation sections 31. Besides, in the information processing apparatus 1, the CPU 11 functions as the drag detection section 32, the vibration information acquisition section 34, the tolerable landing area calculation section 35, and the drag determination section 36. Further, in the information processing apparatus 1, the acceleration sensor 14 functions as the vibration detection section 33.

Accordingly, the information processing apparatus 1 performs the foregoing detection process of the drag between touch panels by the functional structure as stated above.

2. Second Embodiment

[2-1. Outer Appearance Structure of Information Processing Apparatus]

In a second embodiment, since the outer appearance structure of an information processing apparatus 50 (FIGS. 1A to 1C) is similar to the first embodiment, its description is omitted.

[2-2. Circuit Structure of the Information Processing Apparatus]

Figure 9:
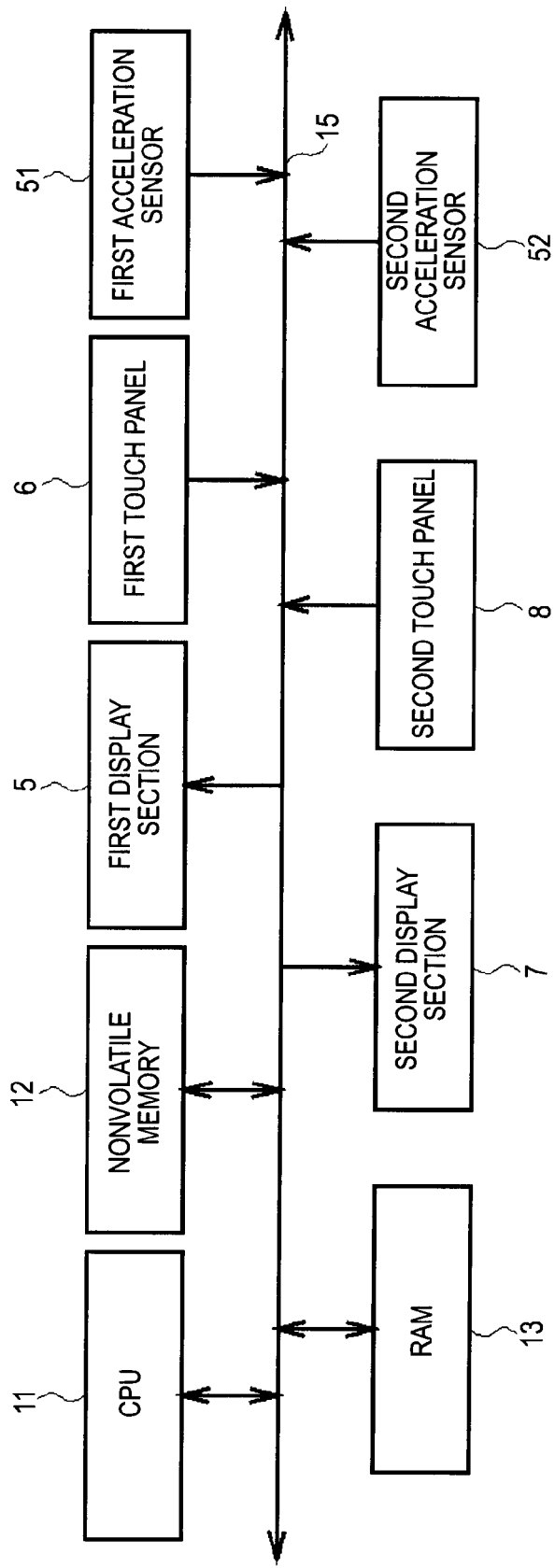
FIG. 9 is a schematic line view showing a circuit structure of the information processing apparatus of the second embodiment.

As shown in FIG. 9 in which a portion corresponding to that of FIG. 2 is denoted by the same reference numeral, in the information processing apparatus 50, instead of the acceleration sensor 14 of the information processing apparatus 1 of the first embodiment, a first acceleration sensor 51 and a second acceleration sensor 52 are provided.

The first acceleration sensor 51 is provided in the inside of a first housing section 2, and can measure acceleration in an Xa axis direction of the first housing section 2, a Ya axis direction, and a direction (hereinafter referred to also as a Za axis direction) vertical to a front surface 2A of the first housing section 2.

The second acceleration sensor 52 is provided in the inside of a second housing section 3, and can measure acceleration in an Xb axis direction of the second housing section 3, a Yb axis direction, and a direction (hereinafter referred to also as a Zb axis direction) vertical to a front surface 3A of the second housing section 3.

Differently from the information processing apparatus 1 of the first embodiment in which it is assumed that the apparatus is used in the fully open state, it is assumed that the information processing apparatus 50 is used in the state where the first housing section 2 and the second housing section 3 are opened at an arbitrary open angle.

Figure 10:
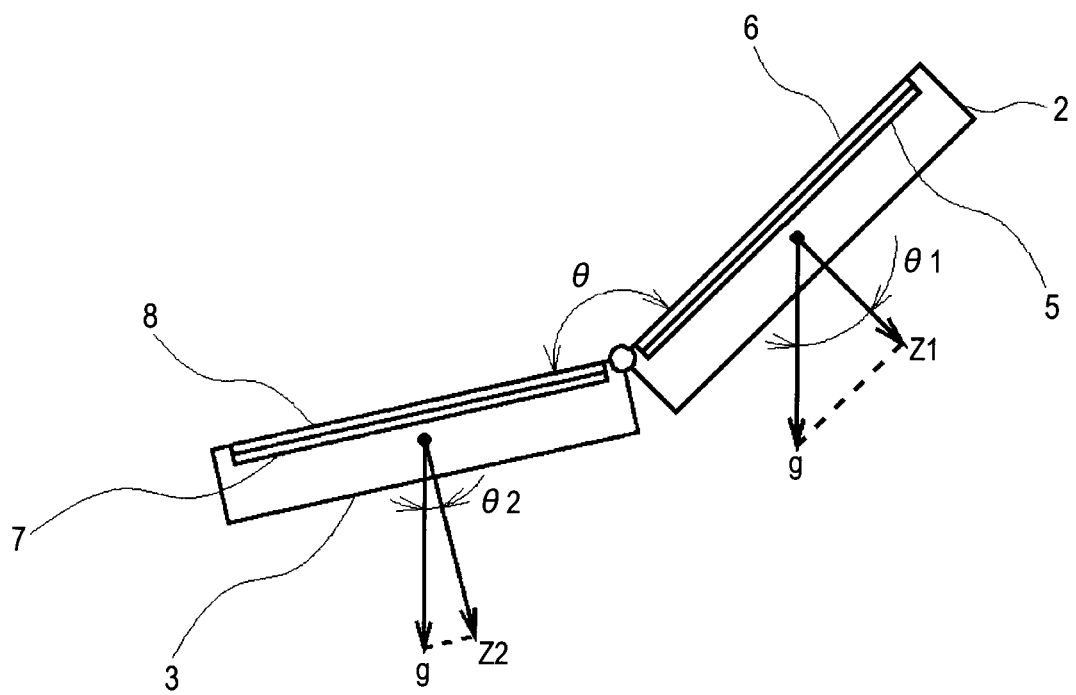
FIG. 10 is a schematic line view showing a state of calculation of an open angle.

At this time, as shown in FIG. 10, the CPU 11 uses acceleration Z1 in the Za axis direction, which is measured by the first acceleration sensor 51 and has an acceleration component caused by the gravitational acceleration g, and calculates an inclination angle $\theta 1$ of the first housing section 2 with respect to the gravity direction.

Besides, the CPU 11 uses acceleration Z2 in the Zb axis direction, which is measured by the second acceleration sensor and has an acceleration component caused by the gravitational acceleration g, and calculates an inclination angle $\theta 2$ of the second housing section 3 with respect to the gravity direction.

The CPU 11 uses the calculated inclination angle $\theta 1$ of the first housing section 2 and the inclination angle $\theta 2$ of the second housing section 3, and can calculate an open angle $\theta$ between the first housing section 2 and the second housing section 3 by the following expression.

$$\theta = 180 - \theta 1 + \theta 2 \qquad (1)$$

[2-3. Detection Process of Drag Between Touch Panels]

The CPU 11 reads a detection process program of drag between touch panels, which is an information processing program of the embodiment according to the invention, from the nonvolatile memory 12, executes it, and performs the detection process of drag between touch panels.

Similarly to the first embodiment, when the first touch panel 6 is continued to be touched by the finger FN of the user, the CPU 11 continues to detect the coordinate of the touch position at specified time intervals. At this time, when the touch position is changed, the CPU 11 detects the touch operation as a drag.

Besides, while the drag is detected, the CPU 11 correlates the coordinate of the touch position on the first touch panel 6 with the time and stores them as drag information in the nonvolatile memory 12.

When the finger FN is moved to the outside of the first touch panel 6, and when detecting the touch position just before the drag by the finger FN on the first touch panel 6 comes not to be detected, the CPU 11 stores, as drag information, the coordinate of the touch position and the time at that time.

When the Y coordinate of the touch position just before the drag by the finger FN on the first touch panel 6 comes not to be detected is "480", the CPU 11 calculates the coordinate range of the second touch panel 8, which would be touched by the finger FN, as the tolerable landing area TA.

On the other hand, the first acceleration sensor 51 and the second acceleration sensor 52 are configured to detect the acceleration at specified intervals from the time point when the drag on the first touch panel 6 comes not to be detected by the CPU 11. Besides, the first acceleration sensor 51 and the second acceleration sensor 52 record the detected acceleration as acceleration information in the nonvolatile memory 12.

The CPU 11 determines whether a specified time passes from the time point when the touch position just before the drag on the first touch panel 6 comes not to be detected is detected.

When the CPU 11 detects that the second touch panel 8 is touched within the specified time, and when the detected touch position is within the tolerable landing area TA, the CPU reads the acceleration information from the nonvolatile memory 12.

Then, the CPU 11 uses the acceleration Z1 in the Za axis direction and the acceleration Z2 in the Zb axis direction, which are detected by the first acceleration sensor 51 and the second acceleration sensor 52, and calculates the inclination angles $\theta 1$ and $\theta 2$. Besides, the CPU 11 uses the calculated inclination angles $\theta 1$ and $\theta 2$ and calculates the open angle $\theta$ by the expression (1).

In the information processing apparatus 50, when the open angle $\theta$ between the first housing section 2 and the second housing section 3 is small, even when the drag between touch panels is performed from the first touch panel 6 to the second touch panel 8, it is conceivable that the second touch panel 8 is depressed by the finger FN.

The CPU 11 determines whether the calculated open angle $\theta$ is within a previously set open angle threshold. The open angle threshold is set to the angle at which the acceleration caused by the vibration in the Zb axis direction generated when the second touch panel 8 is depressed is detected by the second acceleration sensor 52.

That is, in the second acceleration sensor 52, when the open angle $\theta$ is larger than the open angle threshold, even if the drag between touch panels is performed by the finger FN from the first touch panel 6 to the second touch panel 8, the acceleration in the Zb axis direction caused by the vibration generated when the depressing operation is performed is not detected.

Accordingly, when the open angle $\theta$ is larger than the open angle threshold, the CPU 11 sets a first threshold for the absolute value of the acceleration Z1 and the acceleration Z2 measured by the first acceleration sensor 51 and the second acceleration sensor 52.

The first threshold is set to a value smaller than the absolute value of the acceleration Z1 and Z2 of only the acceleration component caused by the vibration generated when the depressing operation or the separating operation is performed by the finger FN to the first touch panel 6 or the second touch panel 8.

Besides, the first threshold is set to the value larger than the absolute value of the acceleration Z1 and Z2 of only the acceleration component caused by the vibration generated when the drag is performed on the first touch panel 6 or the second touch panel 8.

The CPU 11 reads the acceleration information from the nonvolatile memory 12, and based on the acceleration information, the CPU compares the first threshold with the absolute value of the acceleration Z1 detected by the first acceleration sensor 51 and the absolute value of the acceleration Z2 detected by the second acceleration sensor 52.

At this time, when determining that the absolute value of the acceleration Z1 is less than the first threshold and the absolute value of the acceleration Z2 is less than the first threshold, the CPU 11 determines that the user performs the drag between touch panels from the first touch panel 6 to the second touch panel 8.

The CPU 11 detects, as the continuous drag, the drag on the first touch panel 6 and the drag on the second touch panel 8.

Incidentally, the CPU 11 previously removes the acceleration component caused by the gravitational acceleration from the acceleration Z1 and the acceleration Z2 detected by the first acceleration sensor 51 and the second acceleration sensor 52, uses only the acceleration component caused by the vibration and compares it with the first threshold.

On the other hand, when the open angle $\theta$ is within the open angle threshold, when the drag between touch panels is performed from the first touch panel 6 to the second touch panel 8, it is conceivable that the acceleration in the Zb axis direction caused by the vibration generated when the depressing operation is performed is detected by the second acceleration sensor 52.

Accordingly, the CPU 11 sets a first threshold for the absolute value of the acceleration Z1 measured by the first acceleration sensor 51, and sets a second threshold for the absolute value of the acceleration Z2 measured by the second acceleration sensor 52.

The second threshold is set to a value larger than the absolute value of the acceleration Z2 of only the acceleration component caused by the vibration generated when the depressing operation or the separating operation is performed to the second touch panel 8 by the finger FN.

When determining that the absolute value of the acceleration Z1 detected by the first acceleration sensor 51 is less than the first threshold, and the absolute value of the acceleration Z2 detected by the second acceleration sensor 52 is less than the second threshold, the CPU 11 determines that the drag between touch panels is performed from the first touch panel 6 to the second touch panel 8.

At this time, the CPU 11 detects, as the continuous drag, the drag on the first touch panel 6 and the drag on the second touch panel 8.

Incidentally, the CPU 11 previously removes the acceleration component caused by the gravitational acceleration from the acceleration Z1 and the acceleration Z2 detected by the first acceleration sensor 51 and the second acceleration sensor 52, uses only the acceleration component caused by the vibration, and compares it with the first threshold or the second threshold.

Besides, when determining that the drag between touch panels is not performed from the first touch panel 6 to the second touch panel 8, the CPU 11 cancels the drag on the first touch panel 6, and detects the drag on the second touch panel 8 as a new drag.

[2-4. Procedure of Detection Process of Drag Between Touch Panels]

Figure 11:
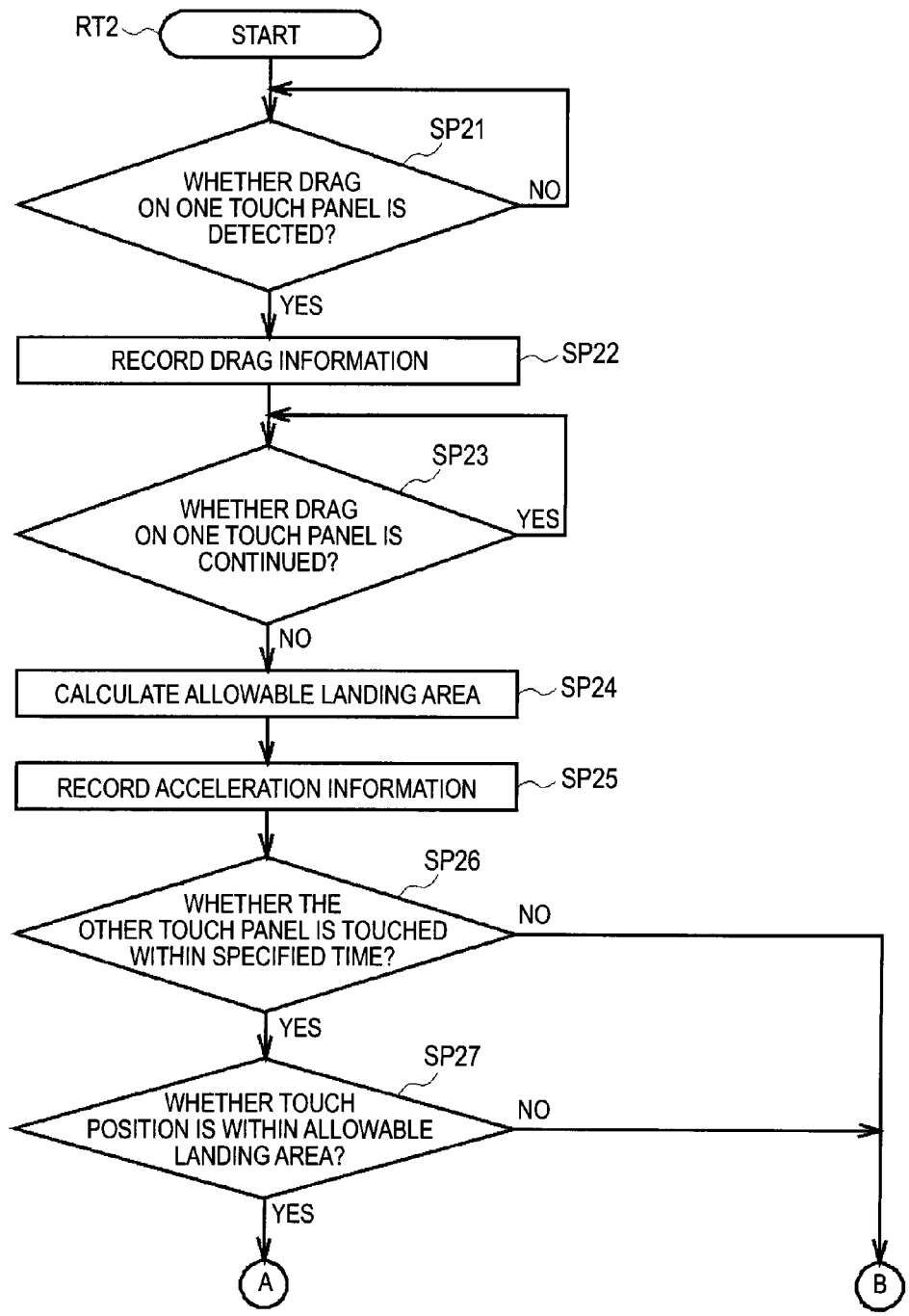
FIG. 11 is a flowchart for explanation of a detection process procedure (1) of drag between touch panels according to the second embodiment.
Figure 12:
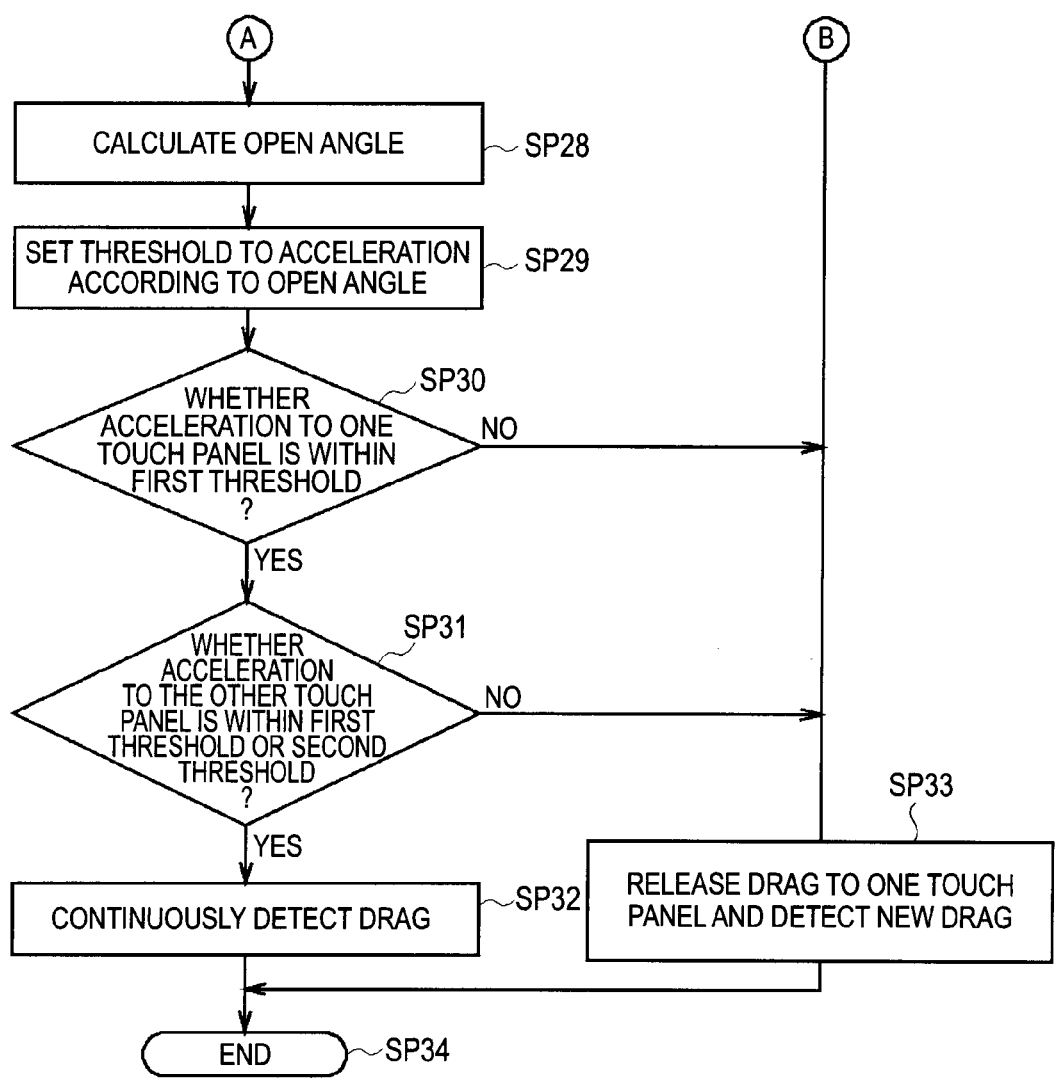
FIG. 12 is a flowchart for explanation of a detection process procedure (2) of drag between touch panels according to the second embodiment.

Next, the procedure of the detection process of drag between touch panels will be described with reference to flowcharts of FIG. 11 and FIG. 12. Actually, the CPU 11 starts with a start step of routine RT2, shifts to step SP21, and detects whether the first touch panel 6 or the second touch panel 8 is dragged.

Here, when a negative result is obtained, this means that the first touch panel 6 and the second touch panel 8 are not dragged, and the CPU returns to step SP21 and waits until the first touch panel 6 or the second touch panel 8 is dragged.

On the other hand, when a positive result is obtained at step SP21, this means that the first touch panel 6 or the second touch panel 8 is dragged, and a shift is made to next step SP22. At step SP22, the CPU 11 detects the coordinate of the touch position at specified time intervals, correlates the coordinate of the touch position with the touch time, records them as drag information in the nonvolatile memory 12, and shifts to next step SP23.

At step SP23, for example, when the first touch panel 6 is dragged, the CPU 11 determines whether the drag on the first touch panel 6 is continued.

When a positive result is obtained, this means that the first touch panel 6 is dragged by the finger FN, and at this time, the CPU 11 returns to step SP23, and repeats until the drag on the first touch panel 6 comes not to be detected.

On the other hand, when a negative result is obtained at step SP23, this means that the drag on the first touch panel 6 comes not to be detected, and a shift is made to next step SP24.

At step SP24, the CPU 11 calculates the estimated landing position TP based on the drag information, calculates the tolerable landing area TA of the specified range in the positive and negative X axis directions with reference to the estimated landing position TP, and shifts to next step SP25.

At step SP25, the CPU 11 controls the first acceleration sensor 51 and the second acceleration sensor 52 to measure the acceleration at specified time intervals, records the measured acceleration as acceleration information in the nonvolatile memory 12, and shifts to next step SP26.

At step SP26, the CPU 11 determines whether the second touch panel 8 is touched within the specified time from the time point when the drag on the first touch panel 6 comes not to be detected.

Here, when a negative result is obtained, this means that the drag between touch panels is not performed from the first touch panel 6 to the second touch panel 8, and the CPU 11 shifts to step SP33.

On the other hand, when a positive result is obtained at step SP26, this means that the second touch panel 8 is touched within the specified time from the time point when the drag on the first touch panel 6 comes not to be detected, and the CPU shifts to next step SP27.

At step SP27, the CPU 11 determines whether the touch position on the second touch panel 8 is within the tolerable landing area TA. Here, when a negative result is obtained, this means that the touch position on the second touch panel 8 is outside the tolerable landing area TA, and the CPU 11 shifts to step SP33.

On the other hand, when a positive result is obtained at step SP27, this means that the touch position on the second touch panel 8 is within the tolerable landing area TA, and the CPU 11 shifts to next step SP28.

At step SP28, based on the acceleration information recorded at step SP25, the CPU 11 uses the acceleration Z1 and Z2 detected by the first acceleration sensor 51 and the second acceleration sensor 52, calculates the open angle $\theta$ by the expression (1), and shifts to next step SP29.

At step SP29, the CPU 11 sets a threshold for the absolute value of the acceleration Z1 and Z2 measured by the first acceleration sensor 51 and the second acceleration sensor 52 according to the open angle $\theta$ calculated at step SP28, and shifts to next step SP30.

Specifically, when the open angle $\theta$ is larger than the open angle threshold, the CPU 11 sets the threshold for the absolute value of the acceleration Z1 and Z2 measured by the first acceleration sensor 51 and the second acceleration sensor 52 to a first threshold.

When the open angle $\theta$ is within the open angle threshold, the CPU 11 sets the threshold for the absolute value of the acceleration Z1 measured by the first acceleration sensor 51 to a first threshold, and sets the threshold for the absolute value of the acceleration Z2 measured by the second acceleration sensor 52 to a second threshold.

At step SP30, the CPU 11 determines whether the absolute value of the acceleration Z1 measured by the first acceleration sensor 51 is within the first threshold. When a negative result is obtained, this means that the depressing operation or the separating operation is performed to the first touch panel 6, and the CPU 11 shifts to step SP33.

On the other hand, when a positive result is obtained at step SP30, the CPU 11 shifts to next step SP31. At step SP31, the CPU 11 determines whether the absolute value of the acceleration Z2 measured by the second acceleration sensor 52 is within the first threshold or the second threshold set at step SP29.

When a negative result is obtained, the CPU 11 shifts to step SP33. On the other hand, when a positive result is obtained, this means that the drag between touch panels is performed by the user from the first touch panel 6 to the second touch panel 8, and the CPU 11 shifts to next step SP32.

At step SP32, the CPU 11 detects, as the continuous drag, the drag on the first touch panel 6 and the drag on the second touch panel 8, shifts to next step SP34 and ends the process.

On the other hand, at step SP33, the CPU 11 cancels the drag on the first touch panel 6, detects the drag on the second touch panel 8 as a new drag, shifts to next step SP34 and ends the process.

Incidentally, when the detection process of drag between touch panels is ended, the CPU 11 again executes the detection process of drag between touch panels, and for example, when the information processing apparatus 50 is in the on state, the CPU always executes the detection process of drag between touch panels.

[2-5. Operation and Effect]

In the above structure, the information processing apparatus 50 detects that for example, the first touch panel 6 is dragged in the state where the touch surface 6A of the first touch panel 6 and the touch surface 8A of the second touch panel 8 are opened at the open angle $\theta$.

After detecting that the first touch panel 6 is dragged, the information processing apparatus 50 comes not to detect the drag on the first touch panel 6, and detects that a position in the coordinate range corresponding to the lower side 6B is touched by the drag.

At this time, the information processing apparatus 50 measures, as acceleration, the vibration to the first touch panel 6 and the second touch panel 8 by the first acceleration sensor 51 and the second acceleration sensor 52. Besides the information processing apparatus 50 calculates the coordinate range of the second touch panel 8, which would be touched by the user when the user performs the drag between touch panels, as the tolerable landing area TA.

The information processing apparatus 50 determines whether the second touch panel 8 is touched within the specified time from the time point when the drag on the first touch panel 6 comes not to be detected.

By this, the information processing apparatus 50 can reduce the process load that the acceleration is continued to be measured by the first acceleration sensor 51 and the second acceleration sensor 52 although the drag between touch panels is not performed.

When the second touch panel 8 is touched within the specified time, the information processing apparatus 50 determines whether the touch position on the second touch panel 8 is within the tolerable landing area TA.

By this, when the user does not perform the drag between touch panels but touches an arbitrary position on the second touch panel 8, the information processing apparatus 50 does not determine that the drag between touch panels is performed. Accordingly, the information processing apparatus can detect the drag between touch panels at high precision.

Further, when the touch position of the second touch panel 8 is within the tolerable landing area TA, the information processing apparatus 50 calculates the open angle θ between the first touch panel 6 and the second touch panel 8 based on the acceleration Z1 and Z2 measured by the first acceleration sensor 51 and the second acceleration sensor 52.

Then, according to the calculated open angle θ, the information processing apparatus 50 sets the first threshold for the absolute value of the acceleration Z1 measured by the first acceleration sensor 51, and sets the first or the second threshold for the absolute value of the acceleration Z2 measured by the second acceleration sensor 52.

Next, the information processing apparatus 50 determines whether the absolute value of the acceleration Z1 and the absolute value of the acceleration Z2 are within the set first or second threshold. When the absolute value of the acceleration Z1 and the absolute value of the acceleration Z2 are within the set first or second threshold, the information processing apparatus 50 determines that the drag between touch panels is performed from the first touch panel 6 to the second touch panel 8. Then, the information processing apparatus 50 detects, as the continuous drag, the drag on the first touch panel 6 and the drag on the second touch panel 8.

By this, since the information processing apparatus 50 uses the acceleration based on the vibration to the first touch panel 6 and the second touch panel 8 and determines whether the drag between touch panels is performed, the drag between touch panels can be detected at high precision.

As stated above, when the second touch panel 8 is touched within the specified time after the first touch panel 6 is dragged, the touch position is within the tolerable landing area TA and the acceleration measured therebetween is within the threshold, the information processing apparatus 50 determines that the drag between touch panels is performed.

By this, only when all the conditions are satisfied, the information processing apparatus 50 determines that the drag between touch panels is performed, and accordingly, the drag between touch panels can be detected at higher precision.

According to the above structure, based on the vibration detected by the first acceleration sensor 51 and the second acceleration sensor 52 after the first touch panel 6 is dragged and before it is detected that the second touch panel 8 is dragged, the information processing apparatus 50 determines whether the drag on the first touch panel 6 and the drag on the second touch panel 8 are continued. By this, since the information processing apparatus 50 determines whether the drag is continued in view of the touch state of the finger FN on the first touch panel 6 and the second touch panel 8, the continuous drag on the first touch panel 6 and the second touch panel 8 can be detected at high precision.

[2-6. Functional Structure of the Information Processing Apparatus]

Here, the functional structure of the information processing apparatus 50 of the second embodiment will be described. As shown in FIG. 13, the information processing apparatus 1 functions as a touch operation section 31, a drag detection section 32, a vibration detection section 33, a vibration information acquisition section 34, a tolerable landing area calculation section 35, a drag determination section 36, an angle detection section 61 and a threshold setting section 62.

In the information processing apparatus 50, the first touch panel 6 and the second touch panel 8 function as the plural touch operation sections 31. Besides, in the information processing apparatus 50, the CPU 11 functions as the drag detection section 32, the vibration information acquisition section 34, the tolerable landing area calculation section 35, the drag determination section 36, the angle detection section 61, and the threshold setting section 62. Further, in the information processing apparatus 50, the first acceleration sensor 51 and the second acceleration sensor 52 function as the vibration detection section 33.

Accordingly, in the information processing apparatus 50, the foregoing detection process of drag between touch panels is executed by the functional structure as stated above.

3. Other Embodiments 3-1. Other Embodiment 1

In the foregoing first and second embodiments, the description has been made on the case where after the first touch panel 6 is dragged, when the second touch panel 8 is touched within the specified time, the touch position is within the tolerable landing area TA and the acceleration measured therebetween is within the threshold, it is determined that the drag between touch panels is performed.

However, the invention is not limited to this, and when the acceleration, which is measured after the first touch panel 6 is dragged and before the second touch panel 8 is touched, is within the threshold, the CPU 11 may determine that the drag between touch panels is performed.

Besides, when the acceleration, which is measured after the first touch panel 6 is dragged and before the second touch panel 8 is touched, is within the threshold, and the touch position is within the tolerable landing area TA, the CPU 11 may determine that the drag between touch panels is performed.

Further, after the first touch panel 6 is dragged, when the second touch panel 8 is touched within the specified time, and the acceleration measured therebetween is within the threshold, the CPU 11 may determine that the drag between touch panels is performed.

3-2. Other Embodiment 2

In the foregoing first and second embodiments, the description has been made on the case where the capacitance type first touch panel 6 and the capacitance type second touch panel 8 are provided. However, the invention is not limited to this, and as long as the coordinate of the touch position of the first touch panel 6 and the second touch panel 8 can be detected, a touch panel of resistive film type, infrared-ray type, electromagnetic induction type, or the like can be applied.

3-3. Other Embodiment 3

Further, in the first and the second embodiments, the description has been made on the case where when the landing estimation position TP is calculated, the locus of the drag is approximated as a straight line based on the drag information to the first touch panel. However, the invention is not limited to this, and the locus of the drag is approximated as a curved line based on the drag information, and an intersection point between the approximated curved line and the second touch panel may be calculated as the landing estimation position TP.

3-4. Other Embodiment 4

In the first embodiment, the description has been made on the case where the vibration to the first touch panel 6 and the second touch panel 8 is detected as the acceleration by the acceleration sensor 14. However, the invention is not limited to this, and the vibration to the first touch panel 6 and the second touch panel 8 may be detected as an angular speed by, for example, a gyro sensor.

Besides, in the second embodiment, the description has been made on the case where the vibration to the first touch panel 6 and the second touch panel 8 is detected as the acceleration by the first acceleration sensor 51 and the second acceleration sensor 52. However, the invention is not limited to this, and the vibration to the first touch panel 6 and the second touch panel 8 may be respectively detected as the angular speed by, for example, the gyro sensor provided in the first housing section 2 and the second housing section 3.

3-5. Other Embodiment 5

Further, in the first and the second embodiments, the description has been made on the case where the user performs the drag between touch panels by using the two touch panels, that is, the first touch panel 6 and the second touch panel 8. However, the invention is not limited to this, and plural touch panels may be used. In this case, a continuous drag across plural panels, for example, three panels can be detected by detecting the continuous drag on the adjacent touch panels.

3-6. Other Embodiment 6

Further, in the first and the second embodiments, the description has been made on the case where the first touch panel 6 and the second touch panel 8 are touched and operated by the finger FN as the operating part. However, the invention is not limited to this, and when the first touch panel 6 and the second touch panel 8 are of, for example, a resistive film type, the touch operation may be performed by a pen or the like.

3-7. Other Embodiment 7

Further, in the second embodiment, the description has been made on the case where the acceleration Z1 and the acceleration Z2 detected by the first acceleration sensor 51 and the second acceleration sensor 52 are used and the open angle θ is calculated by the expression (1). However, the invention is not limited to this, and for example, a specified angle measuring unit is provided between the first housing section 2 and the second housing section 3, and the open angle θ may be calculated based on a value obtained by the angle measuring unit.

3-8. Other Embodiment 8

Further, in the first and the second embodiments, the description has been made on the case where the coupling sections 4A and 4B are respectively shorter than both edges of the first housing section 2 and the second housing section 3 where the first touch panel 6 and the second touch panel 8 in the longer direction are not provided. However, the invention is not limited to this, and the coupling sections 4A and 4B may be respectively longer than both edges of the first housing section 2 and the second housing section 3 where the first touch panel 6 and the second touch panel 8 in the longer direction are not provided.

In this case, for example, in the information processing apparatus 1, portions of the gap area 9 between the first touch panel 6 and the second touch panel 8 where the coupling sections 4A and 4B are provided protrude in the fully open state. At this time, in the information processing apparatus 1, when the user performs the drag between touch panels, the finger FN of the user touches the coupling sections 4A and 4B, and the vibration in the Y axis direction is generated. Accordingly, after the first touch panel 6 is dragged, when the acceleration in the Y axis direction measured before the second touch panel 8 is touched is larger than a specified value, the information processing apparatus 1 may determine that the drag between touch panels is performed.

3-9. Other Embodiment 9

Further, in the first and the second embodiments, the description has been made on the case where the CPU 11 performs the detection process of drag between touch panels in accordance with the detection processing program of drag between touch panels stored in the nonvolatile memory 12. However, the invention is not limited to this, and may perform the detection process of drag between touch panels in accordance with a detection processing program of drag between touch panels installed from a storage medium or downloaded from the Internet. Besides, the detection process of drag between touch panels may be performed in accordance with a detection processing program of drag between touch panels installed in various routes.

3-10. Other Embodiment 10

Further, in the first and the second embodiments, the description has been made on the case where the drag between touch panels from the first touch panel 6 to the second touch panel 8 is detected. However, the invention is not limited to this, and the drag between touch panels from the second touch panel 8 to the first touch panel 6 can also be detected.

3-11. Other Embodiment 11

Further, in the first and the second embodiments, the description has been made on the case where the first touch panel 6 and the second touch panel 8 are provided as the touch operation sections. However, in the embodiment of the invention, touch operation sections having other various structures may be provided.

Further, in the first and the second embodiments, the description has been made on the case where the CPU 11 is provided as the drag detection section, the vibration information acquisition section and the drag determination section. However, in the embodiment of the invention, the drag detection section, the vibration information acquisition section and the drag determination section having other various structures may be provided.

Further, in the first and the second embodiments, the description has been made on the case where the acceleration sensor 14, or the first acceleration sensor 51 and the second acceleration sensor 53 are provided as the vibration detection section. However, in the embodiment of the invention, vibration detection sections having other various structures may be provided.

The invention can be used as an information processing apparatus such as a portable PDA, a note type personal computer or a game machine.

The present application contains subject matter related to that disclosed in Japanese Priority Patent Application JP 2009-055406 filed in the Japan Patent Office on Mar. 9, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a plurality of touch operation sections which are provided to be spaced from each other by a specified distance and detect a position touched by an operating part;
a drag detection section to detect a drag moved in a state where the operating part touches the plurality of touch operation sections;
a vibration detection section to detect a vibration amount of the plurality of touch operation sections;
a vibration acquisition section to acquire the vibration amount detected by the vibration detection section in a period after the drag detection section detects that an arbitrary touch operation section is dragged among the plurality of touch operation sections and before the drag detection section detects that another touch operation section adjacent to the arbitrary touch operation section is dragged;
a drag determination section to determine, based on the vibration amount acquired by the vibration acquisition section, whether the drag on the arbitrary touch operation section is continuous with the drag on the another touch operation section; and
a tolerable landing area calculation section which calculates a tolerable landing area, based upon a position of the drag upon the arbitrary touch operation section, within which the operating part may initially touch the another touch operation section when a continuous drag is performed from the arbitrary touch operation section to the another touch operation section,
wherein the drag on the another touch operation section is a continuation of the continuous drag along a trajectory of the drag on the arbitrary touch operation section.

2. The information processing apparatus according to claim 1, wherein
operation surfaces of the plurality of touch operation sections, together with a gap portion between the touch operation sections adjacent to each other, are disposed on a same plane,
the vibration detection section measures a vibration in a direction vertical to the operation surfaces of the plurality of touch operation sections, and
when the vibration amount acquired by the vibration acquisition section is smaller than a threshold which is smaller than a vibration amount generated by a depressing operation and a separating operation to the touch operation section and is larger than a vibration amount generated by a drag on the touch operation section, the drag determination section determines whether the drag on the arbitrary touch operation section is continuous with the drag on the another touch operation section.

3. The information processing apparatus according to claim 2, wherein the drag determination section determines, based on the vibration amount acquired by the vibration acquisition section and a physical distance between the arbitrary touch operation section and the another touch operation section, whether the drag on the arbitrary touch operation section is continuous with the drag on the another touch operation section.

4. The information processing apparatus according to claim 3,
wherein the tolerable landing calculation area calculates the tolerable landing area based on the drag on the arbitrary operation section detected by the drag detection section and the physical distance between the arbitrary touch operation section and the another touch operation section, and
wherein when the vibration amount acquired by the vibration acquisition section is within the threshold, and the operating part touches within the tolerable landing area calculated by the tolerable landing area calculation section, the drag determination section determines that the drag on the arbitrary touch operation section is continuous with the drag on the another touch operation section.

5. The information processing apparatus according to claim 3,
wherein when the vibration amount acquired by the vibration acquisition section is within the threshold, the operating part touches within the tolerable landing area calculated by the tolerable landing area calculation section, and a time elapsed before the drag detection section detects that the another touch operation section is dragged after the arbitrary touch operation section is dragged is within a specified time, the drag determination section determines that the drag on the arbitrary touch operation section is continuous with the drag on the another touch operation section.

6. The information processing apparatus according to claim 1, further comprising:
a plurality of the vibration detection sections to measure a vibration amount of each of the plurality of touch operation sections which are provided to freely change an angle in a gap portion between the touch operation sections adjacent to each other;
an angle measurement section to measure an angle formed between a touch surface of the arbitrary touch operation section and a touch surface of the another touch operation section; and
a threshold setting section to set a threshold for the vibration amount acquired by the vibration acquisition section according to the angle measured by the angle measurement section, wherein
when each of the vibration amounts of the arbitrary touch operation section and the another touch operation section is smaller than the threshold set by the threshold setting section, the drag detection section determines that the drag on the arbitrary touch operation section is continuous with the drag on the another contact operation section.

7. An information processing method comprising the steps of:
- detecting a drag moved in a state where an operating part touches a plurality of touch operation sections which are provided to be spaced from each other by a specified distance and detect a position touched by the operating part;
- acquiring information of a vibration amount of the plurality of touch operation sections detected by a vibration detection section in a period after it is detected at the step of detecting the drag that an arbitrary touch operation section is dragged among the plurality of touch operation sections and before it is detected that another touch operation section adjacent to the arbitrary touch operation section is dragged;
- determining, based on the vibration amount acquired at the step of acquiring the information of the vibration amount, whether the drag on the another touch operation section is continuous with the drag on the arbitrary touch operation section; and
- calculating a tolerable landing area, based upon a position of the drag upon the arbitrary touch operation section, within which the operating part may initially touch the another touch operation section when a continuous drag is performed from the arbitrary touch operation section to the another touch operation section,
- wherein the drag on the another touch operation section is a continuation of the continuous drag along a trajectory of the drag on the arbitrary touch operation section.

8. A non-transitory computer-readable storage medium having stored thereon a program that when executed by a processor causes a computer to execute the steps of:
- detecting a drag moved in a state where an operating part touches a plurality of touch operation sections which are provided to be spaced from each other by a specified distance and detect a position touched by the operating part;
- acquiring information of a vibration amount of the plurality of touch operation sections detected by a vibration detection section in a period after it is detected at the step of detecting the drag that an arbitrary touch operation section is dragged among the plurality of touch operation sections and before it is detected that another touch operation section adjacent to the arbitrary touch operation section is dragged;
- determining, based on the vibration amount acquired at the step of acquiring the information of the vibration amount, whether the drag on the another touch operation section is continuous with the drag on the arbitrary touch operation section; and
- calculating a tolerable landing area, based upon a position of the drag upon the arbitrary touch operation section, within which the operating part may initially touch the another touch operation section when a continuous drag is performed from the arbitrary touch operation section to the another touch operation section,
- wherein the drag on the another touch operation section is a continuation of the continuous drag along a trajectory of the drag on the arbitrary touch operation section.

9. The information processing apparatus according to claim 1, wherein the continuous drag is a single uninterrupted touch operation.

10. The information processing method according to claim 7, wherein the continuous drag is a single uninterrupted touch operation.

11. The computer-readable storage medium according to claim 8, wherein the continuous drag is a single uninterrupted touch operation.

12. The information processing apparatus according to claim 1, wherein the drag detected by the drag detection section is determined to be a continuous drag only when a detection of start of the drag on the another touch operation section occurs within a predetermined time threshold after completion of the drag on the arbitrary touch operation section, the vibration amount is less than a predetermined vibration threshold, and a starting touch position of the drag on the another touch operation section is within the tolerable landing area.

13. The information processing method according to claim 7, wherein the detected drag is determined to be a continuous drag only when a detection of start of the drag on the another touch operation section occurs within a predetermined time threshold after completion of the drag on the arbitrary touch operation section, the vibration amount is less than a predetermined vibration threshold, and a starting touch position of the drag on the another touch operation section is within the tolerable landing area.

14. The computer-readable storage medium according to claim 8, wherein the detected drag is determined to be a continuous drag only when a detection of start of the drag on the another touch operation section occurs within a predetermined time threshold after completion of the drag on the arbitrary touch operation section, the vibration amount is less than a predetermined vibration threshold, and a starting touch position of the drag on the another touch operation section is within the tolerable landing area.

* * * * *